(12) United States Patent
Gajic et al.

(10) Patent No.: US 7,209,880 B1
(45) Date of Patent: Apr. 24, 2007

(54) SYSTEMS AND METHODS FOR DYNAMIC RE-CONFIGURABLE SPEECH RECOGNITION

(75) Inventors: Bojana Gajic, Trondheim (NO); Shrikanth Sambasivan Narayanan, Los Angeles, CA (US); Sarangarajan Parthasarathy, New Providence, NJ (US); Richard Cameron Rose, Watchung, NJ (US); Aaron Edward Rosenberg, Berkeley Heights, NJ (US)

(73) Assignee: AT&T Corp., New York, NY (US)

( * ) Notice: Subject to any disclaimer, the term of this patent is extended or adjusted under 35 U.S.C. 154(b) by 709 days.

(21) Appl. No.: 10/091,689

(22) Filed: Mar. 6, 2002

Related U.S. Application Data (60) Provisional application No. 60/277,231, filed on Mar. 20, 2001.

(51) Int. Cl.
*G10L 15/00* (2006.01)
*G10L 11/00* (2006.01)
*G06F 15/00* (2006.01)

(52) U.S. Cl. .................. 704/231; 704/270; 704/200
(58) Field of Classification Search ................ 704/234, 704/235, 236, 231, 200, 270
See application file for complete search history.

(56) References Cited

U.S. PATENT DOCUMENTS

| | | | | |
|---|---|---|---|---|
| 5,712,957 A | * | 1/1998 | Waibel et al. | 704/240 |
| 5,797,123 A | * | 8/1998 | Chou et al. | 704/256.5 |
| 5,890,113 A | * | 3/1999 | Takagi | 704/231 |
| 5,897,616 A | * | 4/1999 | Kanevsky et al. | 704/246 |
| 5,970,446 A | * | 10/1999 | Goldberg et al. | 704/233 |
| 6,107,935 A | * | 8/2000 | Comerford et al. | 340/5.52 |
| 6,233,544 B1 | * | 5/2001 | Alshawi | 704/2 |
| 6,243,679 B1 | * | 6/2001 | Mohri et al. | 704/256.8 |
| 6,289,309 B1 | * | 9/2001 | deVries | 704/233 |
| 6,304,844 B1 | * | 10/2001 | Pan et al. | 704/257 |
| 6,502,070 B1 | * | 12/2002 | Boies et al. | 704/224 |
| 2002/0052742 A1 | * | 5/2002 | Thrasher et al. | 704/251 |

OTHER PUBLICATIONS

Colla, Anne Maria, A Connected Speech Recognition System Using A Diphone-Based Language Model, 1985, IEEE, CH 2118-8/85/0000; pp. 1229-1232.*

* cited by examiner

*Primary Examiner*—Tālivaldis Ivars Šmits
*Assistant Examiner*—Myriam Pierre (57) ABSTRACT

Speech recognition models are dynamically re-configurable based on user information, application information, background information such as background noise and transducer information such as transducer response characteristics to provide users with alternate input modes to keyboard text entry. Word recognition lattices are generated for each data field of an application and dynamically concatenated into a single word recognition lattice. A language model is applied to the concatenated word recognition lattice to determine the relationships between the word recognition lattices and repeated until the generated word recognition lattices are acceptable or differ from a predetermined value only by a threshold amount. These techniques of dynamic re-configurable speech recognition provide for deployment of speech recognition on small devices such as mobile phones and personal digital assistants as well environments such as office, home or vehicle while maintaining the accuracy of the speech recognition.

22 Claims, 6 Drawing Sheets

SYSTEMS AND METHODS FOR DYNAMIC RE-CONFIGURABLE SPEECH RECOGNITION

This nonprovisional application claims the benefit of the U.S. provisional application 60/277,231 entitled "ON THE IMPLEMENTATION OF ASR ALGORITHMS FOR HAND-HELD WIRELESS MOBILE DEVICES" filed on Mar. 20, 2001. The Applicants of the provisional application are Bojana GAJIC, Sarangarajan PARTHASARATHY, Richard Cameron ROSE, Aaron Edward ROSENBERG and Shrikanth Sambasivan NARAYANAN. The above provisional application is hereby incorporated by reference including all references cited therein.

BACKGROUND OF THE INVENTION

1. Field of Invention

This invention relates to a method and apparatus for automatic speech recognition.

2. Description of Related Art

Mobile device usage has increased as mobile devices can store more information and as more information can be accessed over networks. However, conventional input methods for mobile devices such as web-enabled phones, personal communication systems, handheld personal digital assistants and other mobile devices are limited. For example, the size of keyboards on mobile devices is limited due to the need to make the mobile device as small and compact as possible.

Conventional limited size keyboards typically use multi-function keys to further reduce size and space requirements. Multi-function keys are keys that depend on the selection of previous key sequences. Multi-function keys can be used to perform many different functions. However, as the number of additional functions increases, multi-function keyboards become difficult to use and the input method becomes error-prone. Decreasing the size of keyboards with multi-function keys further increases the likelihood of mis-keying due to the smaller key size. Thus, decreased size multi-function keys are also error-prone and difficult to use. Some manufacturers have attempted to address these problems with the use of predictive text entry input methods. For example, a type of predictive text entry system used in many web-enabled phones attempts to predict complete words as the keystrokes for each word entered. However, this predictive text entry system mis-identifies words, is not easily adapted to words in different languages, requires the use of a keyboard and is not easy to use.

Some manufacturers of mobile devices have attempted to address keyboard input problems by increasing the size of the mobile device keyboard. For example, the Ericsson model R380 and R380s web-enabled phones are equipped with a flip-up keypad that reveals a larger touch sensitive screen for input functions. However, these touch sensitive screens are expensive, increase the likelihood of damage to the device, increase power requirements and therefore battery size, and fail to provide the user with an input method that is easy to use.

Some personal digital assistant device manufacturers such as Palm and Handspring have attempted to address these limitations of conventional input methods by adding handwriting recognition software to mobile devices such as personal digital assistants. However, handwriting recognition software is also error-prone, requires that the user be trained to write in ways easily recognizable by the handwriting recognition software and fails to provide an input method that is easy to use.

Automatic speech recognition provides an easy-to-use input method for mobile devices. However, some conventional speech recognition systems for mobile devices provide speech recognition tailored for one specific device or as voice dialing systems and may require user intervention such as training. If the user must replace a lost or damaged device with a new device, the new device must be retrained before use or the accuracy of the device is lessened. Also, as the user's usage environment deviates from the training environment, the accuracy of these conventional voice recognition systems is affected. Moreover, the size, power and space limitations of mobile devices also limit the size, complexity and power of the voice recognizer.

Other conventional speech recognition systems use speaker-independent models either in the device or in the network. However, these conventional speaker-independent speech recognition devices do not automatically compensate for changing environments and/or differing transducer response characteristics.

For example, each model of phone is likely to use a transducer with different response characteristics. The response characteristics associated with a head-mounted transducer or microphone used in a home office environment is likely to differ from the response characteristics of a Jabra hands-free EarSet® microphone used by a hands-free mobile phone user. Conventional speech recognition systems assume each mobile device has the same response characteristics, with the result that the accuracy of the speech recognition is reduced.

Similarly, for background noise, a user in a home office environment will experience a quiet and predictable background noise environment. In contrast, a mobile phone user will likely experience constantly changing and frequently noisy background noise environments. Conventional speech recognition systems assume each mobile device experiences the same background noise, resulting in reduced accuracy of the speech recognition system.

SUMMARY OF THE INVENTION

Alternate modes of input for mobile devices that are easy to use and that require little user training would therefore be useful. In various exemplary embodiments according to this invention, individual transducer characteristics, specific background environmental noise characteristics and linguistic constraints imposed by previously recognized application fields are determined and used to adapt speech recognition models. Various other exemplary embodiments according to this invention also provide systems and methods for applying models of transducer characteristics and specific background environmental noise characteristics to speech recognition models such as speaker-independent Hidden Markov Models.

DETAILED DESCRIPTION OF EXEMPLARY EMBODIMENTS

Figure 1:
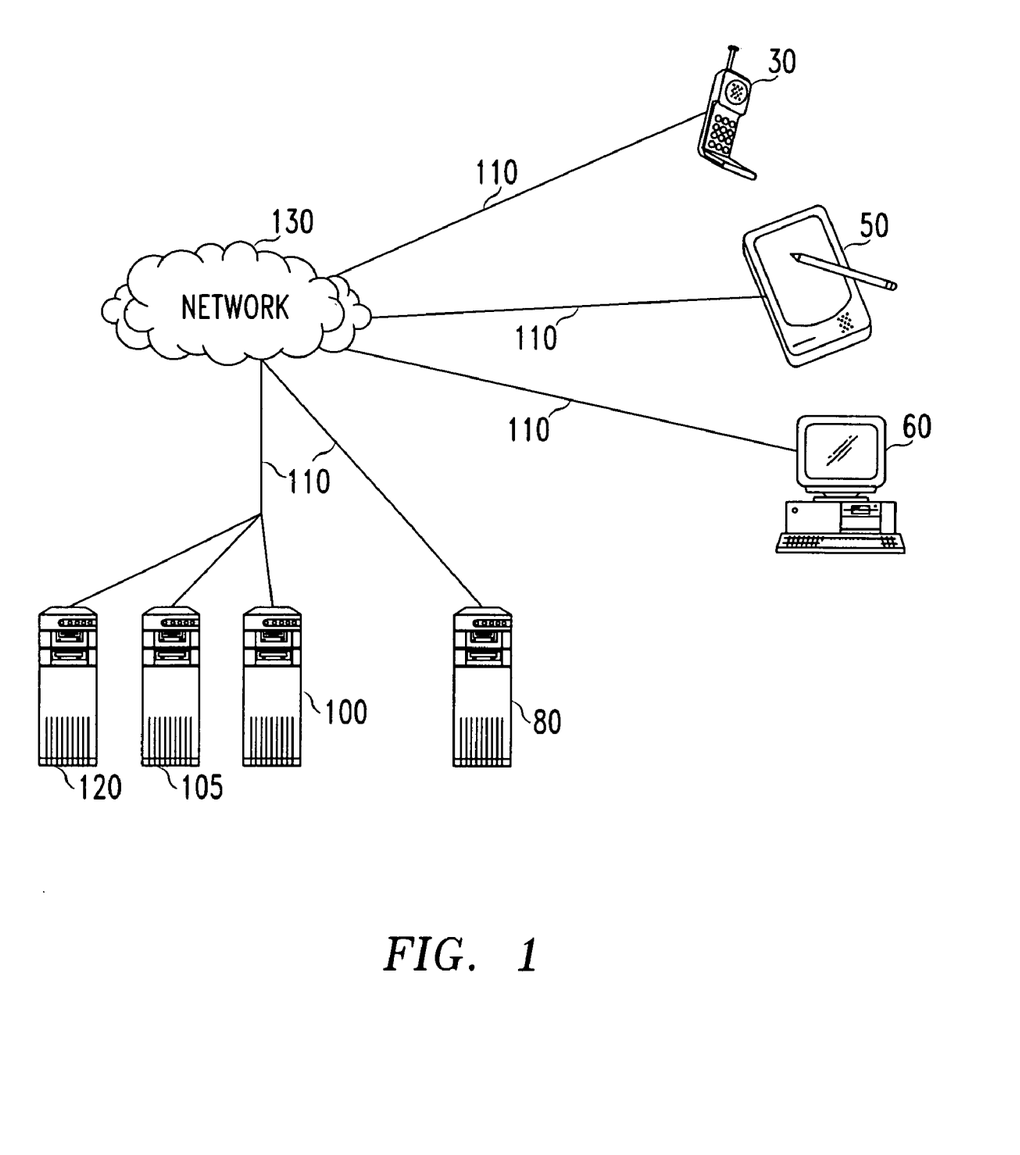
FIG. 1 is a general overview of a first embodiment of a dynamic re-configurable speech recognition system according to this invention.

FIG. 1 is a general overview of a first embodiment of a dynamic re-configurable speech recognition system according to this invention. Mobile phone 30, voice-enabled personal digital assistant 50, voice-enabled computer 60, web server 80, dialog server 100, automatic speech recognition server 105 and dynamic re-configurable speech recognition system 120 are each connected to network 130 via communications links 110.

According to a first exemplary embodiment of this invention, a user of mobile phone 30 initiates a voice request for information from information repository, digital library or web server 80. For example, the user can speak a request into the mobile phone 30 to request a directory listing of a second user. The voice request is forwarded to the dynamic re-configurable speech recognition system 120. The dynamic re-configurable speech recognition system 120 acts as a gateway or proxy to mediate access to information contained in the information repository, digital library or web server 80. For example, the information repository, digital library or web server 80 may store the information in hypertext markup language (HTML), extensible hypertext markup language, (XHTML), extensible markup language (XML), voice extensible hypertext markup language (VXML), Adobe® portable document format (PDF) or any other known or later developed method of storing information.

After receiving a voice request for information from mobile phone 30, the dynamic re-configurable speech recognition system 120 determines the identification of the user. Since most mobile devices are personal communication devices that are permanently assigned to a single user, a mobile device identifier may be used to identify the user. However, for shared mobile devices such as a shared phone used by several different people, a unique user code may be entered at the beginning of the usage session and transmitted with each voice request to identify the user to the dynamic re-configurable speech recognition system 120. Alternatively, the dynamic re-configurable speech recognition system 120 may dynamically adapt the mobile phone 30 to each additional user of the mobile phone 30. The user identifier may be based on rules associated with the phone such as time of day, day of the week, an automatically derived user identification based on the user's speech or any other information or method of user identification without departing from the spirit or scope of this invention.

The dynamic re-configurable speech recognition system 120 retrieves speaker-independent speech recognition models based on the determined user identification. For example, the dynamic re-configurable speech recognition system 120 may retrieve Hidden Markov Models of speech, neural networks parameters, reference templates or any other parameterizable speech recognition model information. Based on a user identifier such as a user telephone number or terminal identifier, the dynamic re-configurable speech recognition system 120 may apply user-specific transformations, background models and/or transducer models to generate a user-specific speech recognition model. Speech recognition word lattice re-scoring of the recognized speech is performed by exploiting inter-relationships between speech to be recognized and speech previously recognized in the application. It will be apparent that the use of a Hidden Markov Model is merely exemplary and that any known or later developed speech recognition model may be used without departing from the spirit or scope of this invention.

The dynamic re-configurable speech recognition system 120 determines an estimate of the background noise parameters. An apparatus and method for robust recognition of speech during a call in a noisy environment is disclosed in U.S. Pat. No. 5,970,446, and is hereby incorporated by reference. The parameters of the background model are saved in system 120 for the user of mobile phone 30. Although this embodiment shows that parameters of the background model can be saved in the system 120, it should be appreciated that the parameters can be stored in any known or later developed storage medium. An estimate of the noise introduced by the current transducer of mobile phone 30 is also generated and saved for the user of mobile phone 30. At least one of the background estimation and transducer estimation parameters of the background model and transducer model for the user of mobile phone 30 are used to adapt the speaker-independent speech recognition model to the current background environment and transducer characteristics of the user of mobile phone 30.

The background- and transducer-adapted speaker-independent speech recognition model for the user of mobile phone 30 and the voice request are forwarded to automatic speech recognition server 105.

The automatic speech recognition server 105 analyzes and recognizes the voice request based on at least one of the background-model and the transducer-adapted speaker-independent speech recognition model for the user of mobile phone 30. A speech word recognition lattice is generated for each data field, for example, that exists in the software application, i.e., template, associated with the mobile device. As a user of mobile phone 30 selects each data field, different language models may be applied to recognize the permitted input values based on the data field selected. Each recognized word in the request is used to re-score other word recognition lattices for which the user of mobile phone 30 has already provided input. The language model for data entries may also be used to derive further constrained language models for application fields to be selected in the future. The word recognition lattice re-scoring is accomplished by concatenating each of the word recognition lattices into a single concatenated lattice. A language model is applied to the single concatenated lattice to determine word recognition lattice inter-relationships. The determined inter-relationships for each word recognition lattice comprising the concatenated lattice are combined. The speech recognition and word recognition lattice re-scoring are repeated until the results are within an acceptable range. For example, a confidence score or uniqueness criteria may be used to automatically select results from a set of determined candidate or hypothesized recognized words or results. As additional data fields are defined by the user, additional word recognition lattices are generated by the word recognizer and the word recognition lattices added to the concatenated lattice. A new concatenated lattice is generated and the additional linguistic constraints describing the new inter-relationship information between fields are enforced in re-scoring the lattices using language models. In this way the dynamic re-configurable speech recognition system 120 improves the recognition for each application as further input is provided by the user.

The dialog server 100 coordinates the required interactions with the user to create a query for the application. For example, the dialog server 100 may request that the user specify a middle initial or street name in a telephone directory application so that "John G. Smith" may be correctly distinguished from "John C. Smith" in the query results. As discussed above, linguistic constraints such as street name information having lower ambiguity may be used to re-score the concatenated lattice to more accurately recognize high ambiguity information such as first and last name.

The voice request is translated into an information request. For example, in various exemplary embodiments according to this invention, the voice request may be translated into a hypertext transfer protocol (HTTP) or any other known or later developed type of information request. The information request is forwarded to the information repository, digital library and/or web server 80. The web server 80 retrieves the requested information. The requested information such as a web page or query result is sent to a dialog server 100. The dialog server 100 translates the requested information into a response such as a spoken response, a textual response, a tactile and/or Braille response or any other method of communicating information. The speech is encoded onto the communications link 110 and sent to the mobile phone 30. The automatic speech recognition server 105, the dialog server 100, the dynamic re-configurable speech recognition system 120 and the information repository, digital library and/or web server 80 are shown as separate devices for discussion purposes. However, it will be apparent that in various other exemplary devices according to this invention, any one or more of the automatic speech recognition server 105, the dialog server 100, the dynamic re-configurable speech recognition system 120 and the information repository, digital library and/or web server 80 may be contained in a single device. Moreover, the automatic speech recognition server 105 may use any system or method of speech recognition capable of receiving speech recognition models or parameters.

Voice requests for information from a user of voice-enabled personal digital assistant 50 are similarly forwarded to dynamic re-configurable speech recognition system 120. The user of voice-enabled personal digital assistant 50 is identified and, based on the user identification information and the information in the voice-request, parameters of the background model and the transducer model are estimated. The user-specific background model and transducer model are used to dynamically adapt the speaker-independent speech recognition models at determined intervals. The speech recognition model is automatically and dynamically compensated with respect to background noise and transducer-induced noise. Lattice re-scoring is applied to the recognized speech to improve the recognition results.

Figure 2:
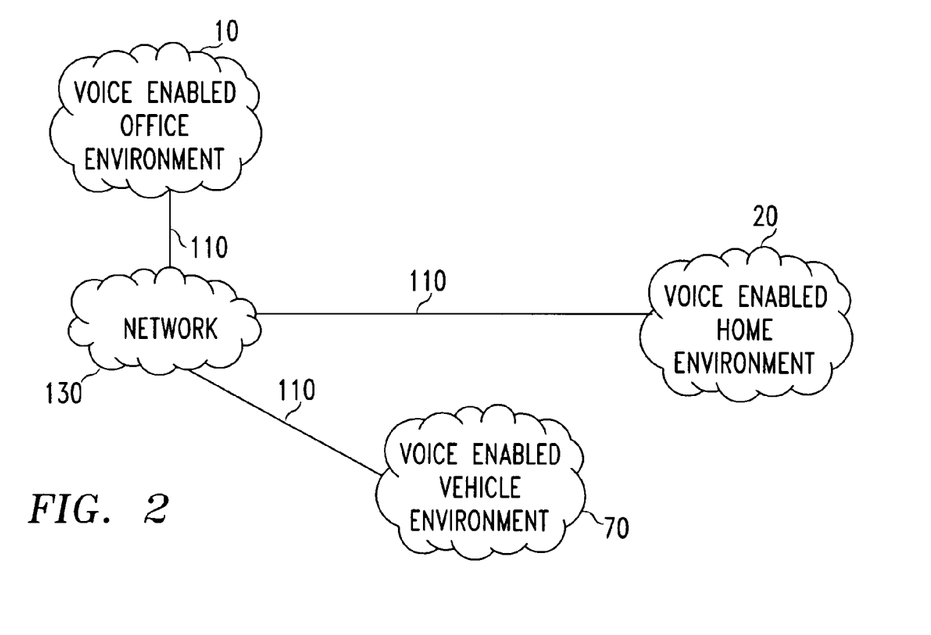
FIG. 2 is a general overview of various exemplary environments in which mobile devices may be used according to this invention.

FIG. 2 is a general overview of exemplary environments in which mobile devices may be used according to this invention. In various alternative embodiments according to this invention, voice-requests from users may be received from a voice enabled office environment 10, voice enabled home environment 20 and/or voice enabled vehicle environment 70. For example, in a conference or seminar held in a voice enabled office environment 10, an office user may be associated with microphones in the voice enabled office environment. The dynamic re-configurable speech recognition system 120 (not shown) may be used to automatically apply appropriate adaptations for each microphone as the background noise environment changes and for the different applications required.

In various other exemplary embodiments according to this invention, identified users of the dynamic re-configurable speech recognition system 120 (not shown) in the voice-enabled office environment 10 may initiate voice requests to display information from an information source accessible over communication link 110 and using the application specific constraints such as recognized data fields to improve the recognition accuracy. In still other embodiments according to this invention, the automatically recognized speech may be automatically transcribed for later printing, review and/or discussion.

Similarly, in a voice-enabled vehicle environment 70, the identified user of the voice-enabled vehicle environment 70 may also request information such as map directions for a head-up display, adjust entertainment systems such as volume and/or channel selection, adjust temperature controls and/or provide information to any system and/or device requiring input without departing from the spirit or scope of this invention. It will be apparent that any application and/or device may be controlled by voice information using the dynamic re-configurable speech recognition system 120 according to this invention.

Figure 3:
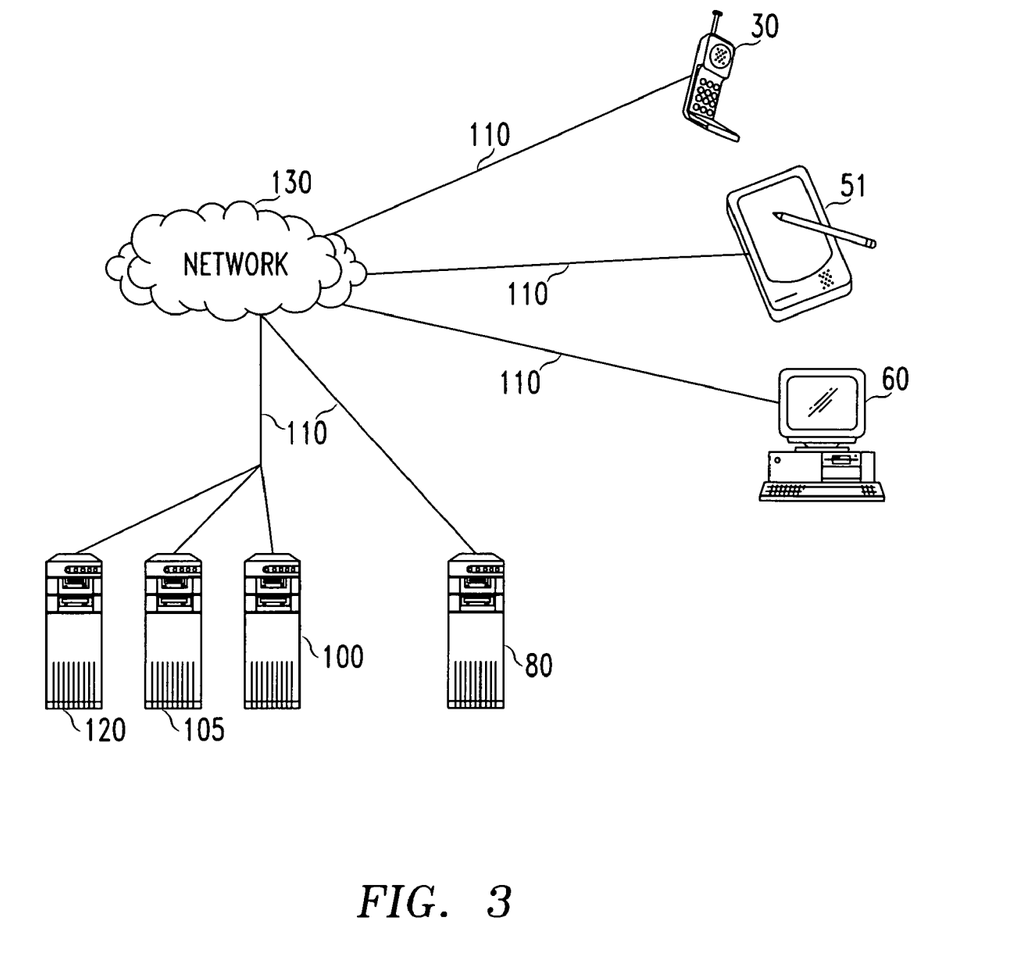
FIG. 3 is a general overview of a second embodiment of a dynamic re-configurable speech recognition system according to this invention.

FIG. 3 is a general overview of a second embodiment of a dynamic re-configurable speech recognition system according to this invention. Voice-enabled personal digital assistant 51 may directly incorporate a dialog server 100' (not shown), automatic speech recognition server 105' (not shown) and dynamic re-configurable speech recognition system 120' (not shown) to initiate voice requests for information over communications link 110 to web server 80. In contrast, voice-enabled computer 60 and web server 80 connected to communications link 110 initiate voice requests through dialog server 100, automatic speech recognition server 105 and dynamic re-configurable speech recognition system 120.

For example, voice-enabled personal digital assistant 51 may include a VisorPhone® peripheral attached to the Handspring Visor® personal digital assistant 51. The microphone of the VisorPhone® peripheral may have different microphone characteristics than the microphone contained in the Jabra EarSet®, or the Ericsson R380 or R380s smartphone discussed above. Since a different microphone has been selected, the same user experiences different effects from the background noise on the accuracy of the automatic speech recognition system. In the various exemplary embodiments according to this invention, the dynamic re-configurable speech recognition system 120' (not shown) contained within the personal digital assistant 51 dynamically adapts the speech recognition models based on the user's current transducer and background noise environment. Lattice re-scoring is then performed to exploit the linguistic constraints of previously recognized speech utterances by dynamically re-configuring the speech recognition model to apply the additional information.

Figure 4:
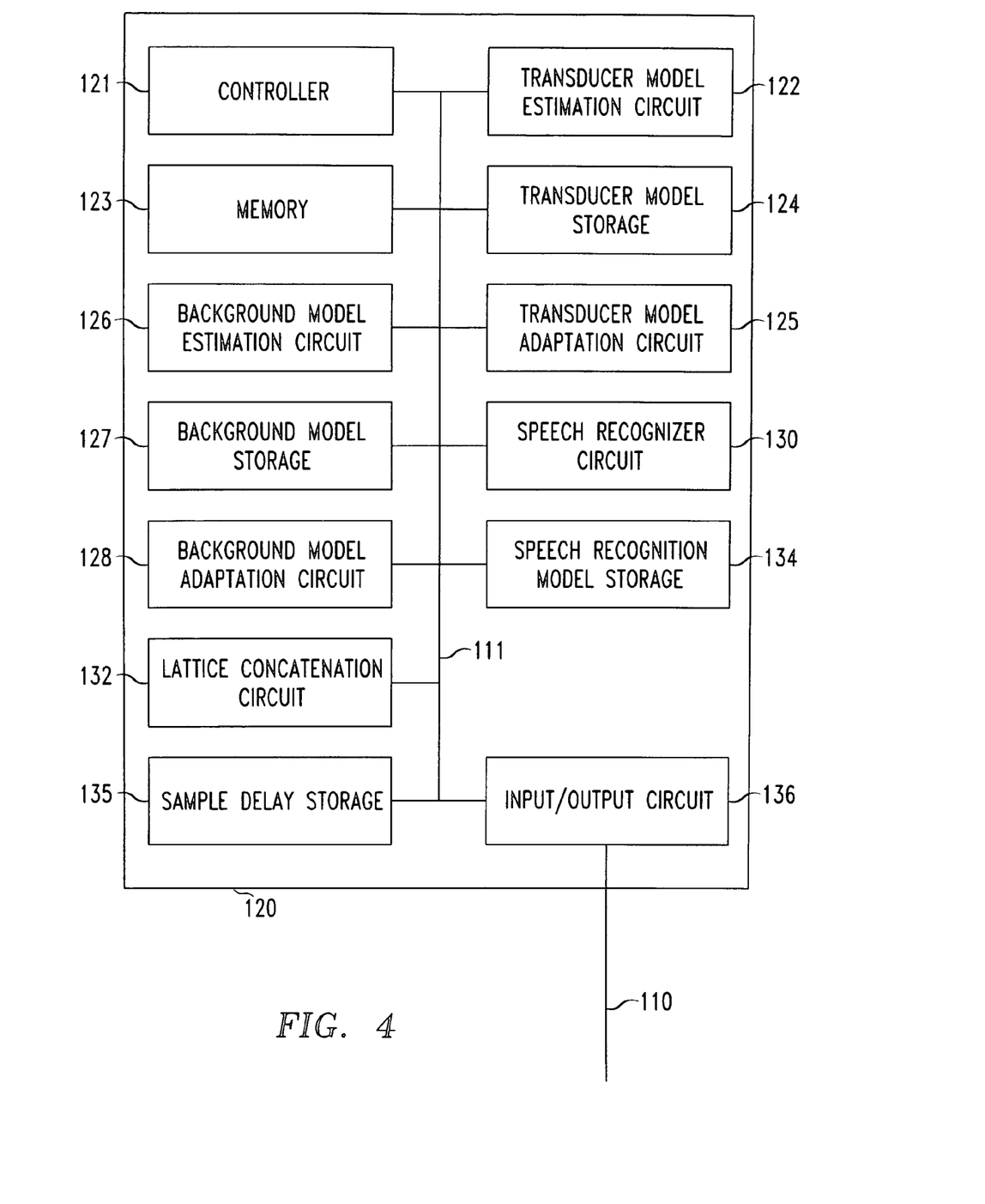
FIG. 4 shows an exemplary embodiment of a dynamic re-configurable speech recognition system according to this invention.

FIG. 4 shows an exemplary embodiment of a dynamic re-configurable speech recognition system 120 that can include components inter-connected through a common bus 111. The dynamic re-configurable speech recognition system 120 includes a controller 121, transducer model estimation circuit 122, memory 123, transducer model-storage 124, transducer model adaptation circuit 125, background model estimation circuit 126, background model storage 127, background model adaptation circuit 128, speech recognizer circuit 130, lattice concatenation circuit 132, optional speech recognition model storage 134 and sample delay storage 135, each connected through input/output circuit 136 to communication link 110.

In a first exemplary embodiment according to this invention, a voice request for information is received over communications link 110. The controller 121 reads the sample delay storage 135 and based on the specified delay activates the background model estimation circuit 126 to determine the background noise environment of the voice request.

The background model estimation circuit 126 constantly determines the background model. For example, the background model estimation circuit 126 may sample the periods of speech inactivity to determine the parameters of the background noise environment for the user's current location. In various other exemplary embodiments, the sample delay may be set to a high sampling frequency to capture changes as the user traverses environments or as the user changes transducers. In various other exemplary embodiments, the sampling frequency may be set to reduce the number of samples.

A speech recognition model, such as a speaker-independent Hidden Markov Model, is retrieved from storage. It will be apparent that the speech recognition model may be stored in a separate server, stored in optional speech recognition model storage 134 of the dynamic re-configurable speech recognition system 120 or in any location accessible via communications link 110.

The background model adaptation circuit 128 is activated to adapt the retrieved speech recognition model based on the results of the background model estimation circuit 126 for the user. In this way, compensation for the user's background noise environment is provided. The background model is stored in the background model storage 127. In various alternative embodiments, the background model may be stored in a configuration server (not shown) as further discussed in co-pending applications entitled "SYSTEMS AND METHODS FOR AUTOMATIC SPEECH RECOGNITION", Ser. Nos. 09/966,259 and 09/966,081, filed Oct. 1, 2001, and "SYSTEMS AND METHODS FOR DYNAMIC RE-CONFIGURABLE SPEECH RECOGNITION" Ser. No. 09/972,929, filed Oct. 10, 2001, all hereby incorporated by reference in their entirety. It will be apparent that the configuration server may be located in any location accessible via communication link 110.

The controller 121 activates the transducer model estimation circuit 122 to determine a model of the transducer characteristics and to determine how the user's current transducer characteristics relate to the response characteristics of the transducers used to develop the speech recognition model. For example, the relationship between the user's actual transducer and the training transducer or microphone can be determined by determining an easily-recognized word having low ambiguity in a received voice request. The predicted signal for the easily recognized low ambiguity word is compared with the background adapted signal for the easily recognized low ambiguity word. The relationship between the predicted and background adapted signals reflects the difference between the user's actual transducer and the transducers used during initial input. In various other exemplary embodiments, the response characteristics may be determined by polling the mobile device for transducer information, having the mobile device send new information when the transducer information changes, or using any other known or later developed supervised or unsupervised calibration process.

The controller 121 activates the transducer model adaptation circuit 125 to adapt the retrieved background-adapted speech recognition model with the parameters of the transducer model. The transducer- and background-adapted speech recognition model compensates for the noise of the transducer used in each device. The estimated parameters of the transducer model are stored in the transducer model storage 124.

For application-related voice requests such as the telephone directory query discussed above, the speech recognition circuit 130 recognizes the speech and generates a word recognition lattice for each of the data fields into which a user may attempt to enter information—for example, the first name, last name, street, city, state, zip code and country information of the telephone directory application. As the user enters values for each data field, the controller 121 activates the lattice concatenation circuit 132 to concatenate the multiple word lattices into a single combined lattice. The controller 121 applies a language model to the concatenated lattice to determine the inter-relationships between each word recognition lattice. The controller 121 combines the determined inter-relationship results for each lattice. New candidate or hypothesized field values are generated based on the determined inter-relationships. In this way, as additional linguistic constraint information is entered by the user, the word recognition of previous entered and prospective field entries is improved. If the controller 121 determines the candidate or hypothesized field value does not lie within an acceptable range or confidence level, circuit 130 is activated to perform speech recognition again and re-score the concatenated lattice until the results are within an acceptable range or confidence level.

In various exemplary embodiments according to this invention, the frequency of background estimates and transducer estimates is based on the specified sample delay storage 135. However, it will be apparent that in various other embodiments according to this invention, the sample delay may be set to a specific value, dynamically determined based on the frequency or magnitude of determined changes in the sampled information, sampled continuously or may employ any other known or later developed technique of sampling the background and transducer noise information without departing from the spirit or scope of this invention.

If the sample delay storage indicates that a sample has occurred within the period indicated by the sample value, the controller 121 may retrieve the background estimation from background model storage 127 and retrieve transducer estimations from transducer model storage 124.

In one exemplary embodiment according to this invention, the speech recognition models are retrieved from optional speech recognition model storage 134 into memory 123. The retrieved speech recognition models are then adapted by the background model estimation circuit 126 to compensate for background noise in the user's current environment. The transducer model adaptation circuit 125 adapts the background-adapted speech recognition models for transducer or microphone noise. The background- and transducer-adapted speech recognition models and the voice request are output by the input/output circuit 136 over communication link 110 to automatic speech recognition server 105. The automatic speech recognition server 105 dynamically determines the user's speech information in the received voice request based on the background- and transducer-adapted speech recognition models.

Figure 5:
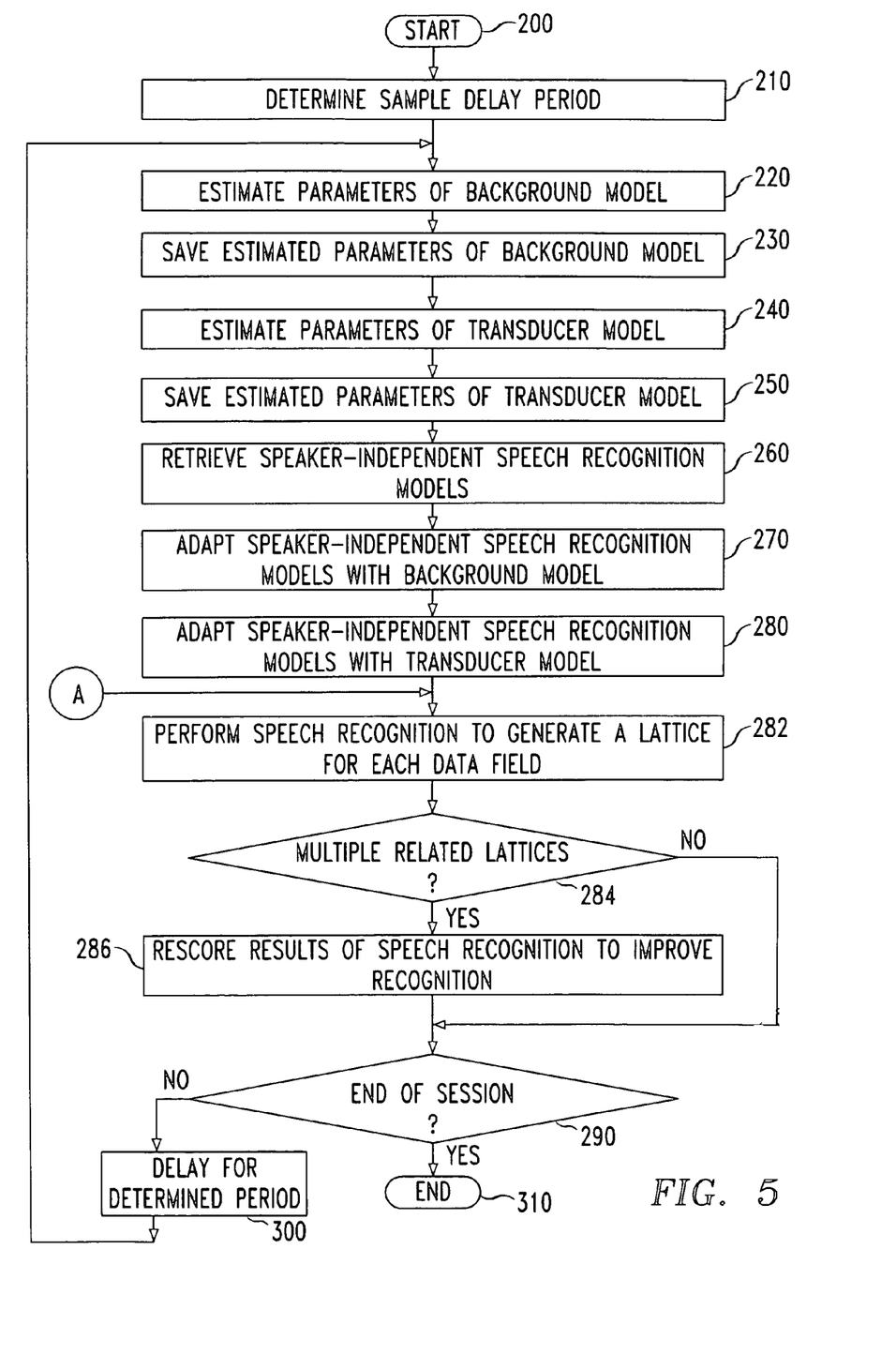
FIG. 5 is a flowchart of an exemplary method for dynamic re-configurable speech recognition according to this invention.

FIG. 5 is a flowchart of an exemplary method for dynamic speech recognition according to this invention. The process begins at step 200 and control is then immediately transferred to step 210.

In step 210 a sample delay period is determined. The sample delay period reflects the amount of time or delay that will occur between each sample of the background information and transducer information. In various exemplary embodiments of this invention, a specific sample delay may be set in a memory location or may be determined dynamically based on a degree of change determined between successive samples.

For example, a sample delay period may be increased as successive comparisons of the background estimation and the transducer estimation do not exceed a threshold value. As changes are detected between successive comparisons of the background estimations and transducer estimations, the sample delay period may be decreased to more quickly respond to future changes. Alternatively, any known or later developed method of determining a sample delay may be used in the practice of this invention. After the sample delay period is determined, control is transferred to step 220.

In step 220, the parameters of the background noise in the user's environment is determined. The parameters of the background model may be estimated by comparing a sampled period of silence with a previously determined period of silence. The determined differences may be used to estimate the current background noise. However, it will be apparent that any known or later developed method of determining background noise may be used in the practice of this invention. Control is then transferred to step 230.

In step 230, the estimated parameters of the background model are saved. The estimated parameters may be saved in random access memory, flash memory, magnetic storage, magneto-optical storage or any other known or later developed storage medium. Control is then transferred to step 240.

The parameters of the transducer model are determined in step 240. The estimated parameters of the transducer model may indicate the users type of microphone, the response characteristics of the microphone, head-mount characteristics, in-ear characteristics, equivalency to another microphone or any other information concerning the response of the microphone or transducer. In various alternative embodiments according to this invention, the parameters of the transducer may be determined dynamically. For example, after compensating for the background environment, the speech recognition model produced for un-ambiguous words may be dynamically compared to previously sampled un-ambiguous words to dynamically estimate parameters of the transducer model.

The transducer model is used to adjust for differing response characteristics of the transducers found in various devices. For example, the transducer response characteristics for a Jabra EarSet® microphone-earphone combination will differ from the response characteristics of a Sennheiser HMD410 headset and the transducer in an Ericsson R380s smartphone. The transducer model is based on the determined relationship between each user's actual transducer or microphone and the transducers or microphones used in developing the original speaker-independent speech recognition model. After the parameters of the transducer model are estimated, control is transferred to step 250.

In step 250, the determined transducer model is saved. For example, the transducer model may be saved in random access memory, flash memory, magnetic storage, magneto-optical storage or any other known or later developed storage medium. Control is then transferred to step 260.

A speech recognition model is retrieved in step 260. The retrieved speech recognition model may be a Hidden Markov Model, a neural network or any other known or later developed speech recognition model. In various exemplary embodiments, the speech recognition model may be retrieved from random access memory, flash memory, magnetic storage, magneto-optical storage or any other known or later developed storage medium. Control is then transferred to step 270.

In step 270, the speech recognition models are adapted with the determined background model retrieved from storage based on the user. In various other exemplary embodiments according to this invention, the background-adapted speech recognition model for the user may be saved in memory. Control is transferred to step 280.

The background-adapted speech recognition model is adapted with a determined transducer model retrieved from storage based on the user in step 280. Control continues to step 282.

In step 282, speech recognition using the compensated speech recognition model is performed. The speech recognition process results in the generation of single or multiple word recognition lattices for each recognized speech utterance. Because vocabularies involved in automatic speech recognition can be very large, and statistical language models may not apply, the tasks of performing speech recognition can result in high language model perplexity which can cause high word error rates. Thus, a re-scoring of the lattices is performed. The lattice re-scoring is discussed in greater detail below. It should be appreciated that automatic speech recognition techniques using speech recognition models are well known, and are therefore not described in greater detail in this disclosure.

In step 284, a determination is made whether the speech recognition process generated multiple word recognition lattices that have inter-relationships existing between each other. If multiple related word recognition lattices exist, control continues to step 286. Otherwise, control continues to step 290.

In step 286, lattice re-scoring of the results of the speech recognition is performed in order to improve the accuracy of the automatic speech recognition process. The lattice re-scoring process is described in greater detail below with respect to FIG. 6. Control continues to step 290.

In step 290, a determination is made whether the voice request session has ended. If a user of a mobile device has initiated a session with a voice-enabled information provider number such as TELLME Corporation, BeVocal Corporation or any other voice information provider, the termination of the user's call will coincide with the termination of the user's session. However, in various other exemplary embodiments, a user session may start before the user initiates a call to an information provider. For example, a network operator may voice-enable the initiation of a call to allow users to voice-dial a number in the network. In this case, the start of a user session may coincide with the start of network call initiation.

In various other exemplary embodiments according to this invention, the dynamic speech recognition system may be used in second- and third-generation mobile networks. For example, GPRS always-on packet-based networks may be used to carry the voice request information. In this case, a method of determining a user session might be a user's voice command to initiate a call or make a connection over the GPRS network. However, it will be apparent that any known or later developed method of determining a user session may be used without departing from the spirit or scope of this invention.

If an end of session request is not determined in step 290, control is transferred to step 300 and the process is delayed for a determined sample delay period. The delay period may be set to a pre-determined value or may be adjusted dynamically. For example, the delay period may be based on detected changes in the background environment and/or the transducer environment. Control then returns to step 220 and the process continues until it is determined in step 290 that the user session has been terminated.

The user session may be terminated by the user pressing the "END" key of a voice-activated phone, turning off the device, by a voice-command such as a voice-off or any other known or later developed method of indicating an end of a user session. When a determination is made in step 290 that the user session has been terminated, control continues to step 310 and the process ends.

Figure 6:
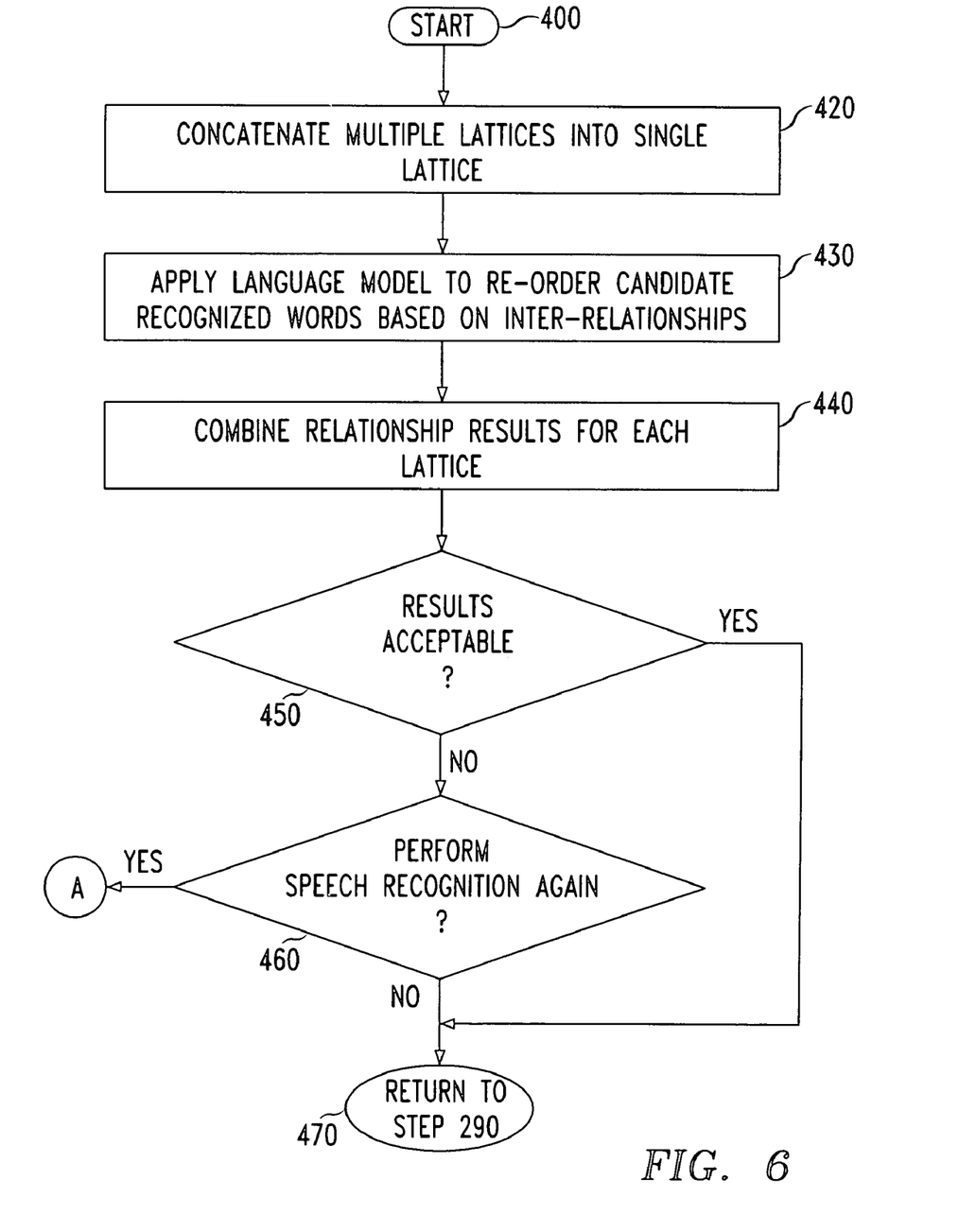
FIG. 6 is a flowchart of an exemplary method for an automatic speech recognition process used in an embodiment of this invention.

FIG. 6 shows an exemplary flowchart of a more detailed process for re-scoring the speech recognition results in accordance with an embodiment of this invention. After it has been determined to re-score the speech recognition results, control begins in step 400 and immediately continues to step 420.

In step 420, each of the generated multiple word recognition lattices are concatenated into a single concatenated lattice. Control continues to step 430.

A language model is applied to the concatenated single lattice to determine inter-relationships which may exist between each of the lattices. It will be apparent that the language model may use any known or later developed sources of rules to determine inter-relationship constraints between recognized word in the fields. The candidate solutions for the value of the entry in each field are re-ordered based on the determined inter-relationships to simultaneously derive and/or refine the hypothesized recognized word based on the user field entries. Control continues to step 440.

In step 440, the determined relationship results between the multiple lattices are combined. The relationship results reflect the inter-relationships between each data field and corresponding lattice. As entries are made into fields, the concatenated lattice is updated. The inter-relationships between word recognition sub-lattices within the combined lattice based on the language model are used to dynamically re-configure word recognition lattices for entered and prospective field values based on the previously entered values. Control continues to step 450.

A determination is made in step 450 whether the results are acceptable. For example, a confidence score based on predetermined values could be used in determining whether the solutions are acceptable. If the results are determined to be acceptable, control continues to step 470. Otherwise, control continues to step 460. In step 460, a determination is made whether the speech recognition process should be performed again. For example, if new data fields are to be used, additional speech recognition may be required. If so, the operation returns to step 282 of FIG. 5. Otherwise, control continues to step 470. In step 470, control is returned to step 290 of FIG. 5 and the lattice re-scoring process ends.

In the various exemplary embodiments outlined above, the dynamic re-configurable speech recognition system 120 can be implemented using a programmed general purpose computer. However, the dynamic re-configurable speech recognition system 120 can also be implemented using a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device capable of implementing a finite state machine that is in turn capable of implementing the flowcharts shown in FIGS. 5–6 can be used to implement the dynamic re-configurable speech recognition system 120.

Each of the circuits 121–136 of the dynamic re-configurable speech recognition system 120 outlined above can be implemented as portions of a suitably programmed general purpose computer. Alternatively, circuits 121–136 of the dynamic re-configurable speech recognition system 120 outlined above can be implemented as physically distinct hardware circuits within an ASIC, or using a FPGA, a PDL, a PLA or a PAL, or using discrete logic elements or discrete circuit elements. The particular form each of the circuits 121–136 of dynamic re-configurable speech recognition system 120 outlined above will take is a design choice and will be obvious and predictable to those skilled in the art.

Moreover, dynamic re-configurable speech recognition system 120 and/or each of the various circuits discussed above can each be implemented as software routines, managers or objects executing on a programmed general purpose computer, a special purpose computer, a microprocessor or the like. In this case, dynamic re-configurable speech recognition system 120 and/or each of the various circuits discussed above can each be implemented as one or more routines embedded in the communications network, as a resource residing on a server, or the like. The dynamic re-configurable speech recognition system 120 and the various circuits discussed above can also be implemented by physically incorporating dynamic re-configurable speech recognition system 120 into a software and/or hardware system, such as the hardware and software systems of a voice-enabled device.

As shown in FIG. 4, the memory 123, the transducer model storage 124, the background model storage 127, and/or the sample delay storage 135 can each be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 110 shown in FIGS. 1–4 can each be any known or later developed device or system for connecting a communication device to the dynamic re-configurable speech recognition system 120, including a direct cable connection, a connection over a wide area network or a local area network, a connection over an intranet, a connection over the Internet, or a connection over any other distributed processing network or system. In general, the communication links 110 can each be any known or later developed connection system or structure usable to connect devices and facilitate communication.

Further, it should be appreciated that the communication link 110 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of dynamic re-configurable speech recognition comprising:
determining an identity of a speaker based, at least in part, on a user identifier;
repeatedly determining parameters of a background model based on sampled information collected at a periodic time interval during a received voice request;
determining parameters of a transducer model;
adapting a speech recognition model based on user-specific transformations corresponding to the determined identity of the speaker and on at least one of the background model or the transducer model;
applying one of a plurality of language models to the received voice request for speech recognition based on a data field selected by the speaker;
re-scoring automatic speech recognition using the speech recognition model comprising:
generating word lattices representative of speech utterances in the received voice request,
concatenating the word lattices into a single concatenated lattice,
applying at least one language model to the single concatenated lattice in order to determine word lattice inter-relationships;
determining information in the received voice request based on the re-scored results of the speech recognition model; and
adjusting the periodic time interval based, at least in part, on determined changes in the sampled information.

2. The method of claim 1, further comprising:
generating a confidence score to determine whether the generated word lattices are acceptable.

3. The method of claim 2, wherein:
the parameters of the background model are determined based on a first sample period;
the parameters of the transducer model are determined based on a second sample period; and
the confidence score is compared to a predetermined value in order to determine whether to perform the automatic speech recognition process again.

4. The method of claim 2, further comprising:
saving at least one of the parameters of the background model and the parameters of the transducer model.

5. The method of claim 1, further comprising:
repeatedly determining the parameters of the transducer model.

6. The method of claim 1, wherein the user identifier comprises a calling phone number.

7. The method of claim 1, wherein the user identifier is based on a plurality of rules associated with a telephone and at least one of a time of day or a day of a week.

8. A system for dynamic re-configurable speech recognition comprising:
a background model estimation circuit for repeatedly determining a background model at a periodic time interval during a voice request based, at least in part, on estimated background parameters based on collected sampled information;
a transducer model estimation circuit for determining a transducer model of the voice request based, at least in part, on estimated transducer parameters;
a background model adaptation circuit and a transducer model adaptation circuit for determining an adapted speech recognition model based on a speech recognition model and at least one of the background model or the transducer model;
a speech recognition circuit for recognizing speech and generating a speech lattice for each of a plurality of data fields for which a user provides voice input, the speech recognition circuit being arranged to use a different language model for each of the plurality of data fields;
a lattice concatenation circuit that concatenates at least two speech lattices based on speech utterances in the received voice request into a single lattice; and
a controller that applies at least one language model to the single concatenated lattice to determine relationships between the lattices, wherein
the controller is adapted to adjust the periodic time interval based, at least in part, on changes in the collected sampled information, and
the controller is adapted to determine an identity of a speaker based, at least in part on a user identifier and to apply user-specific transformations, corresponding to the identity of the speaker, to the speech recognition model.

9. The system of claim 8, wherein the controller generates a confidence score after applying the speech recognition model to determine whether the lattices are acceptable.

10. The system of claim 9, wherein,
the controller is configured to compare the confidence score to a predetermined value, and
the controller is further configured to repeat automatic speech recognition of the voice request based, at least in part, on the comparing.

11. The system of claim 9, wherein the controller saves at least one of the background model or the transducer model into storage, and wherein the adapted speech recognition model is based on at least one of the background model or the transducer model.

12. The system of claim 8, wherein the transducer model estimation circuit is configured to repeatedly determine the transducer model at the periodic time interval.

13. The system of claim 8, wherein the user identifier comprises a calling phone number.

14. The system of claim 8, wherein the user identifier is based on a plurality of rules associated with a telephone and at least one of a time of day or a day of a week.

15. A computer readable storage medium comprising:
computer-readable program code usable to program a computer to perform a method for dynamic re-configurable speech recognition, the method comprising:
determining an identity of a speaker based, at least in part, on a user identifier;
determining parameters of a background model at a periodic time during a voice request;
determining parameters of a transducer model;
adapting a speech recognition model based on user-specific transformations corresponding to the determined identity of the speaker and on at least one of the background model or the transducer model;
applying one of a plurality of language models to the received voice request for speech recognition based on a data field selected by the speaker;
re-scoring automatic speech recognition using the speech recognition model, comprising:
generating word lattices representative of speech utterances in the received voice request,
concatenating the word lattices into a single concatenated lattice, applying at least one language model to the single concatenated lattice
in order to determine word lattice inter-relationships;
determining information in the received voice request based on the rescored results of the speech recognition model; and
adjusting the periodic time based, at least in part, on determined changes in sampled noise information.

16. The computer readable storage medium of claim 15, wherein the method further comprises:
repeatedly determining parameters of the transducer model at a periodic time.

17. A method of dynamic re-configurable speech recognition comprising:
determining an identity of a speaker based, at least in part, on a user identifier;
repeatedly determining parameters of a background model based, at least in part, on first sampled information collected at first periodic time intervals during a received voice request;
repeatedly determining parameters of a transducer model based, at least in part, on second sampled information collected at second periodic time intervals during a received voice request;
determining a speech recognition model based on user-specific transformations corresponding to the determined identity of the speaker and on at least one of the background model or the transducer model;
applying one of a plurality of language models to the received voice request for speech recognition based on a data field selected by the speaker;
re-scoring automatic speech recognition using the speech recognition model, comprising:
generating word lattices representative of speech utterances in the received voice request,
concatenating the word lattices into a single concatenated lattice, and
applying at least one language model to the single concatenated lattice in order to determine word lattice inter-relationships; and
determining information in the received voice request based on the rescored results of the speech recognition model.

18. The method of claim 17, further comprising:
adjusting a length of the first periodic time intervals based, at least in part, on the collected first sampled information.

19. The method of claim 17, further comprising:
adjusting a length of the first periodic time intervals based, at least in part, on a frequency or a magnitude of determined changes in successively sampled ones of the first sampled information.

20. The method of claim 17, further comprising:
generating a confidence score after applying the speech recognition model to determine whether the generated word lattices are acceptable;
comparing the confidence score to a predetermined value; and
repeating automatic speech recognition of the received voice request based, at least in part, on a result of the comparing of the confidence score with the predetermined value.

21. The method of claim 17, wherein the user identifier comprises a calling phone number.

22. The system of claim 17, wherein the user identifier is based on a plurality of rules associated with a telephone and at least one of a time of day or a day of a week.

* * * * *